United States Patent
Stovall et al.

(10) Patent No.: US 10,816,426 B2
(45) Date of Patent: Oct. 27, 2020

(54) PRESSURE SENSOR FOR DETECTING A PRESSURE DIFFERENTIAL

(71) Applicant: CNH Industrial America, LLC, New Holland, PA (US)

(72) Inventors: Christopher Stovall, Chicago, IL (US); Jaesik Yu, Inverness, IL (US)

(73) Assignee: CNH Industrial America LLC, New Holland, PA (US)

( * ) Notice: Subject to any disclaimer, the term of this patent is extended or adjusted under 35 U.S.C. 154(b) by 343 days.

(21) Appl. No.: 15/624,798

(22) Filed: Jun. 16, 2017

(65) Prior Publication Data
US 2018/0364128 A1 Dec. 20, 2018

(51) Int. Cl.
*A01B 63/22* (2006.01)
*G01L 13/06* (2006.01)
*G01L 13/02* (2006.01)
*A01B 63/32* (2006.01)
*A01B 27/00* (2006.01)
*F15B 19/00* (2006.01)
(Continued)

(52) U.S. Cl.
CPC .............. *G01L 13/06* (2013.01); *A01B 63/22* (2013.01); *G01L 13/02* (2013.01); *A01B 27/005* (2013.01); *A01B 49/027* (2013.01); *A01B 63/32* (2013.01); *F15B 11/10* (2013.01); *F15B 19/005* (2013.01); *F15B 2211/57* (2013.01); *F15B 2211/6313* (2013.01); *F15B 2211/7053* (2013.01)

(58) Field of Classification Search
CPC ......... A01B 63/22; A01B 63/32; G01L 13/00; G01L 13/02
See application file for complete search history.

(56) References Cited

U.S. PATENT DOCUMENTS 2,400,048 A * 5/1946 Jones .................... G01L 13/02
251/54
3,085,437 A 4/1963 Osterstrom
(Continued)

FOREIGN PATENT DOCUMENTS

| FR | 2885218 A1 * | 11/2006 | .......... G01L 9/0089 |
| GB | 652880 A * | 5/1951 | .............. G01L 7/00 |
| GB | 1279391 | 9/1968 | |

OTHER PUBLICATIONS

Machine Translation for FR2885218.*

*Primary Examiner* — Gary S Hartmann
(74) *Attorney, Agent, or Firm* — Rebecca L. Henkel; Rickard K. DeMille

(57) ABSTRACT

In one aspect, a pressure sensor for detecting a pressure differential between first and second fluid sources may include sensor body defining a cavity and a seal plate slidably positioned within the cavity. The seal plate may define first and second chambers within the cavity, which may respectively be in fluid communication with the first and second fluid sources. The sensor may also include a sensing element configured to detect a position of the seal plate relative to the sensor body, which may be indicative of the pressure differential between the first and second fluid sources. The sensor may further include a first spring positioned within the first chamber and compressed between a first side of the seal plate and the sensing element. Additionally, the sensor may include a second spring positioned within the second chamber and compressed between a second side of the seal plate and the sensor body.

20 Claims, 5 Drawing Sheets

(51) Int. Cl.
*A01B 49/02* (2006.01)
*F15B 11/10* (2006.01)

(56) References Cited

U.S. PATENT DOCUMENTS

| | | | |
|---|---|---|---|
| 3,461,725 A | | 8/1969 | Gardiner et al. |
| 3,583,374 A | | 6/1971 | Scholl et al. |
| 3,756,126 A | * | 9/1973 | Granada ................. F16J 15/32 |
| | | | 92/38 |
| 4,668,889 A | * | 5/1987 | Adams .................... G01L 13/00 |
| | | | 310/338 |
| 5,024,294 A | | 6/1991 | Van Fossen et al. |
| 5,219,041 A | | 6/1993 | Greve |
| 5,396,802 A | | 3/1995 | Moss |
| 5,827,978 A | | 10/1998 | Kadlicko |
| 6,068,064 A | * | 5/2000 | Bettin ..................... A01B 63/32 |
| | | | 172/413 |
| 6,651,505 B2 | * | 11/2003 | Hattori .................... G01L 9/007 |
| | | | 73/706 |
| 8,935,962 B2 | * | 1/2015 | Gammon ................. G01B 7/30 |
| | | | 73/715 |
| 9,057,654 B2 | * | 6/2015 | Gammon ................. G01L 7/16 |
| 10,151,769 B2 | * | 12/2018 | Lehmann ................ G01L 13/00 |
| 2012/0036937 A1 | * | 2/2012 | Sprenger ............... G01L 9/0089 |
| | | | 73/744 |
| 2013/0291645 A1 | * | 11/2013 | Gammon ................. G01L 7/16 |
| | | | 73/716 |

* cited by examiner

PRESSURE SENSOR FOR DETECTING A PRESSURE DIFFERENTIAL

FIELD

The present disclosure generally relates to pressure sensors and, more particularly, to pressure sensors having a spring-biased seal plate for detecting pressure differentials between different fluid sources.

BACKGROUND

Agricultural implements generally include various fluid-driven actuators, such as hydraulic actuators, for adjusting the down force on certain ground-engaging tools, such as shanks, discs, tines, baskets, and/or the like. Specifically, each actuator includes a cylinder defining a cap-side chamber and a rod-side chamber. Each actuator also includes a piston positioned within the cylinder that separates the cap-side and rod-side chambers. Furthermore, each actuator includes a rod extending outward from the associated piston that is coupled to one of the ground-engaging tools. As such, the pressure differential between the fluid in the cap-side and rod-side chambers controls the position of the piston and rod relative to the cylinder, which, in turn, controls the down force on the associated ground-engaging tool.

To estimate the pressure differential between the cap-side and rod-side chambers of a given implement actuator, current sensing systems use a pressure sensor to detect the pressure of the fluid within the cap-side chamber while relying on an estimated pressure for the opposed rod-side chamber. However, in many instances, the rod-side chamber pressure estimate may be inaccurate, thereby leading to an incorrect pressure differential measurement.

Accordingly, an improved pressure sensor with a spring-biased seal plate for use in measuring a pressure differential between two fluid sources would be welcomed in the technology

BRIEF DESCRIPTION

Aspects and advantages of the technology will be set forth in part in the following description, or may be obvious from the description, or may be learned through practice of the technology.

In one aspect, the present subject matter is directed to a pressure sensor for detecting a pressure differential between a first fluid source and a second fluid source. The pressure sensor may include sensor body defining a cavity and a seal plate slidably positioned within the cavity. The seal plate may define first and second chambers within the cavity. The first chamber may be in fluid communication with the first fluid source, and a second chamber may be in fluid communication with the second fluid source. The pressure sensor may also include a sensing element coupled to the body. The sensing element may be configured to detect a position of the seal plate relative to the sensor body. The position of the seal plate may be indicative of the pressure differential between the first and second fluid sources. The pressure sensor may further include a first spring positioned within the first chamber, where the first spring may be compressed between a first side of the seal plate and the sensing element. Additionally, the pressure sensor may include a second spring positioned within the second chamber, where the second spring being compressed between a second side of the seal plate and the sensor body.

In another aspect, the present subject matter is directed to a fluid-driven actuator configured for use with an agricultural implement. The fluid-driven actuator may include a cylinder defining a first fluid chamber and a second fluid chamber. The fluid-driven actuator may also include a piston housed within the cylinder between the first and second fluid chambers. The fluid-driven actuator may further include a manifold in fluid communication with the first and second fluid chambers. Additionally, the fluid-driven actuator may include a pressure sensor provided in operative association with the manifold. The pressure sensor may include sensor body defining a cavity and a seal plate slidably positioned within the cavity. The seal plate may define first and second chambers within the cavity. The first chamber may be in fluid communication with the first fluid source, and a second chamber may be in fluid communication with the second fluid source. The pressure sensor may also include a sensing element coupled to the body. The sensing element may be configured to detect a position of the seal plate relative to the sensor body. The position of the seal plate may be indicative of the pressure differential between the first and second fluid sources. The pressure sensor may further include a first spring positioned within the first chamber, where the first spring may be compressed between a first side of the seal plate and the sensing element. Additionally, the pressure sensor may include a second spring positioned within the second chamber, where the second spring being compressed between a second side of the seal plate and the sensor body.

In a further aspect, the present subject matter is directed to an agricultural implement. The agricultural implement may include a frame, a ground-engaging tool pivotably coupled to the frame, and a fluid-driven actuator coupled between the frame and the ground-engaging tool. The fluid-driven actuator may be configured to adjust a position of the ground-engaging tool relative to the frame. The fluid-driven actuator may include a cylinder defining a first fluid chamber and a second fluid chamber. The fluid-driven actuator may also include a piston housed within the cylinder between the first and second fluid chambers. The fluid-driven actuator may further include a manifold in fluid communication with the first and second fluid chambers. Additionally, the fluid-driven actuator may include a pressure sensor provided in operative association with the manifold. The pressure sensor may include sensor body defining a cavity and a seal plate slidably positioned within the cavity. The seal plate may define first and second chambers within the cavity. The first chamber may be in fluid communication with the first fluid source, and a second chamber may be in fluid communication with the second fluid source. The pressure sensor may also include a sensing element coupled to the body. The sensing element may be configured to detect a position of the seal plate relative to the sensor body. The position of the seal plate may be indicative of the pressure differential between the first and second fluid sources. The pressure sensor may further include a first spring positioned within the first chamber, where the first spring may be compressed between a first side of the seal plate and the sensing element. Additionally, the pressure sensor may include a second spring positioned within the second chamber, where the second spring being compressed between a second side of the seal plate and the sensor body.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
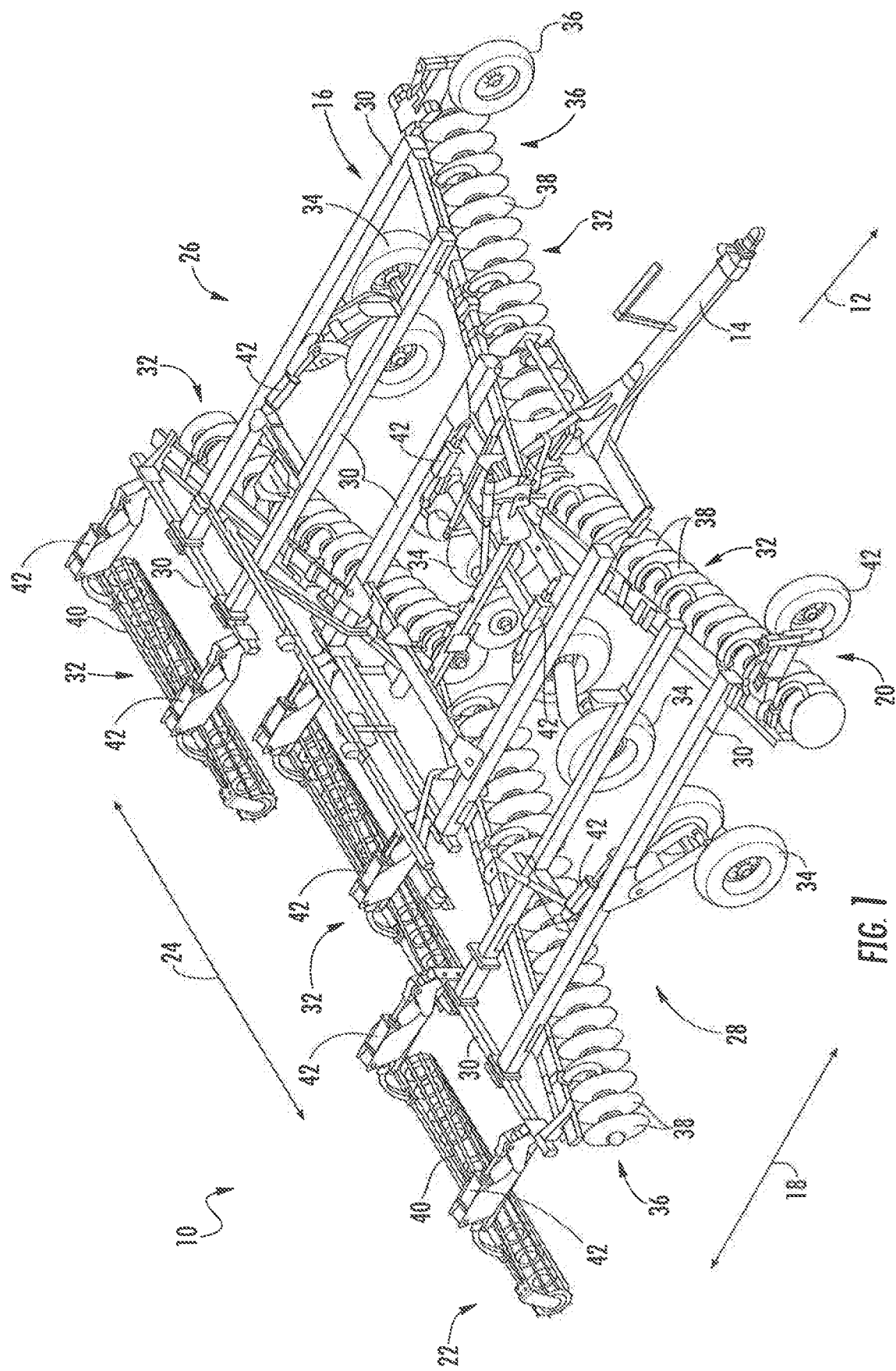
FIG. 1 illustrates a perspective view of one embodiment of an agricultural implement in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a pressure sensor for detecting a pressure differential between first and second fluid sources, such as between cap-side and rod-side chambers of a fluid-driven actuator. Specifically, in several embodiments, the pressure sensor may include a sensor body defining a cavity. The pressure sensor may also include a seal plate slidably positioned within the cavity such that the seal plate defines first and second chambers within the cavity. The first chamber may be in fluid communication the first fluid source, such as one of the cap-side or rod-side chambers of the actuator, while the second chamber may be in fluid communication the second fluid source, such as the other of the cap-side or rod-side chambers of the actuator. The pressure sensor may further include a sensing element coupled to the sensor body for detecting a position of the seal plate relative to the sensor body.

Additionally, in accordance with aspects of the present subject matter, the pressure sensor may further include a first spring positioned within the first chamber and a second spring positioned within the second chamber. For example, the first spring may be compressed between a first side of the seal plate and the sensing element so as to exert a bias force on one side the seal plate. Similarly, the second spring may be compressed between a second side of the seal plate and the sensor body so as to exert a bias force on the opposed side of the seal plate. During operation of the pressure sensor, the pressure differential between the first and second fluid sources may cause the seal plate to slide within the cavity. In particular, the greater of the pressures in the first or second chamber may overcome the biasing force exerted on the seal plate by the associated spring positioned within the other of the first or second chambers, thereby causing the seal plate to move within the cavity of the sensor body. As such, this movement of the seal plate relative to the seal body may be indicative of the pressure differential between the first and second fluid sources.

Referring now to FIG. 1, a perspective view of one embodiment of an agricultural implement 10 is illustrated in accordance with aspects of the present subject matter. In general, the implement 10 may be configured to be towed along a direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

As shown, the frame 16 may extend in a longitudinal direction (e.g., as indicated by arrow 18 in FIG. 1) between a forward end 20 and an aft end 22. The frame 16 may also extend in a lateral direction (e.g., as indicated by arrow 24 in FIG. 1) between a first side 26 and a second side 28. Additionally, the implement 10 may include various wheels 34 coupled to the frame 16 to support the frame 16 relative to the ground and to facilitate towing the implement 10 in the direction of travel 12.

In several embodiments, the frame 16 may include a plurality of structural frame members 30, such as beams, bars, and/or the like, configured to support a plurality of components, such as various ground-engaging elements 32. For example, in one embodiment, the frame 16 may be configured to support one or more gangs or sets 36 of disk blades 38. In such an embodiment, each disk blade 38 may, for example, include both a concave side (not shown) and a convex side (not shown). In addition, the gangs 36 of disk blades 38 may be oriented at an angle relative to the travel direction 12 to promote more effective tilling of the soil. However, it should be appreciated that the frame 16 may support any other suitable ground-engaging tools 32 or combination of ground-engaging tools 32. For example, in alternate embodiments, the frame 16 may support various shanks, leveling blades, tines, and/or the like.

Moreover, in several embodiments, the implement 10 may optionally include additional ground-engaging tools 32, such as one or more basket assemblies or rotary firming wheels 40. As is generally understood, the basket assemblies 40 may be configured to reduce the number of clods in the soil and/or firm the soil over which the implement 10 travels. As shown, each basket assembly 40 may be configured to be pivotally coupled to one of the frame 16. Alternately, the basket assemblies 40 may be configured to be pivotally coupled to any other suitable location of the implement 10, such as a harrow (not shown) coupled to the frame 16. It should be appreciated that the implement 10 may include any suitable number of basket assemblies 40. In fact, some embodiments of the implement 10 may not include any basket assemblies 40.

Additionally, the implement 10 may also include any suitable number of fluid-driven actuators 42 for adjusting the relative positioning between various components of the implement 10. For instance, as shown, a pair of the actuators 42 may be coupled between the each basket assembly 40 and the frame 16 for raising and lowering the associated basket assembly 40 relative to the ground, thereby allowing the down force of the basket assemblies 40 to be adjusted. Furthermore, other actuators 42 may be configured to adjust the relative positioning between other components of the implement 10, such as between the wheels 34 and the frame 16 or between the gangs 36 of disk blades 38 and the frame 16.

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Figure 2:
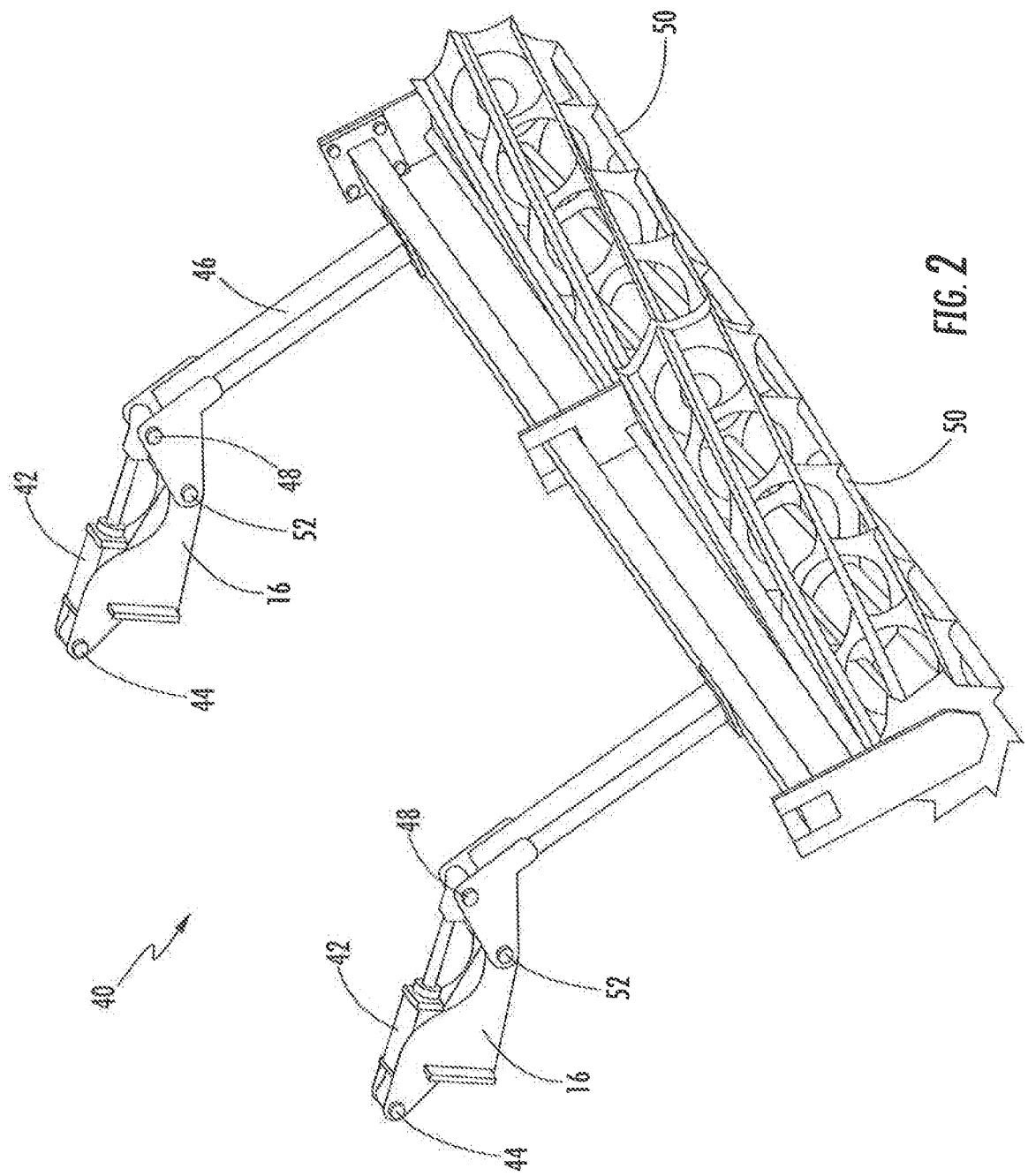
FIG. 2 illustrates a perspective view of one embodiment of a basket assembly in accordance with aspects of the present subject matter, particularly illustrating a pair of fluid-driven actuators for adjusting the position of the basket assembly relative to the ground.

Referring now to FIG. 2, a perspective view of an exemplary embodiment of one of the basket assemblies 40 shown in FIG. 1 is illustrated in accordance with aspects of the present subject matter. Specifically, in several embodiments, the basket assembly 40 may be configured to be pivotable or otherwise moveable relative to the frame 16 of the implement 10 to permit one or more associated actuators 42 to adjust the position of the basket assembly 40 relative to the frame 16. For example, in one embodiment, the ends of a pair of actuators 42 may be pivotably coupled to the frame 16 of the implement 10 at pivot joints 44. Similarly, the opposed ends of the actuators 42 may be pivotably coupled to a basket assembly frame 46 of the basket assembly 40 at pivot joints 48. The basket assembly frame 46, which may rotatably support one or more baskets 50, may, in turn, be coupled to the frame 16 at pivot joints 52. As such, the pivot joints 44, 58, 52 may allow relative pivotable movement between the frame 16, the basket assembly 40, and the actuator(s) 42, thereby permitting the position of the basket assembly 40 relative to the frame 16 to be adjusted. However, a person of ordinary skill in the art would appreciate that the basket assembly 40 may be adjustably coupled to the frame 16 in any suitable manner that permits the actuator(s) 42 to move the basket assembly 40 relative to the frame 16.

Figure 3:
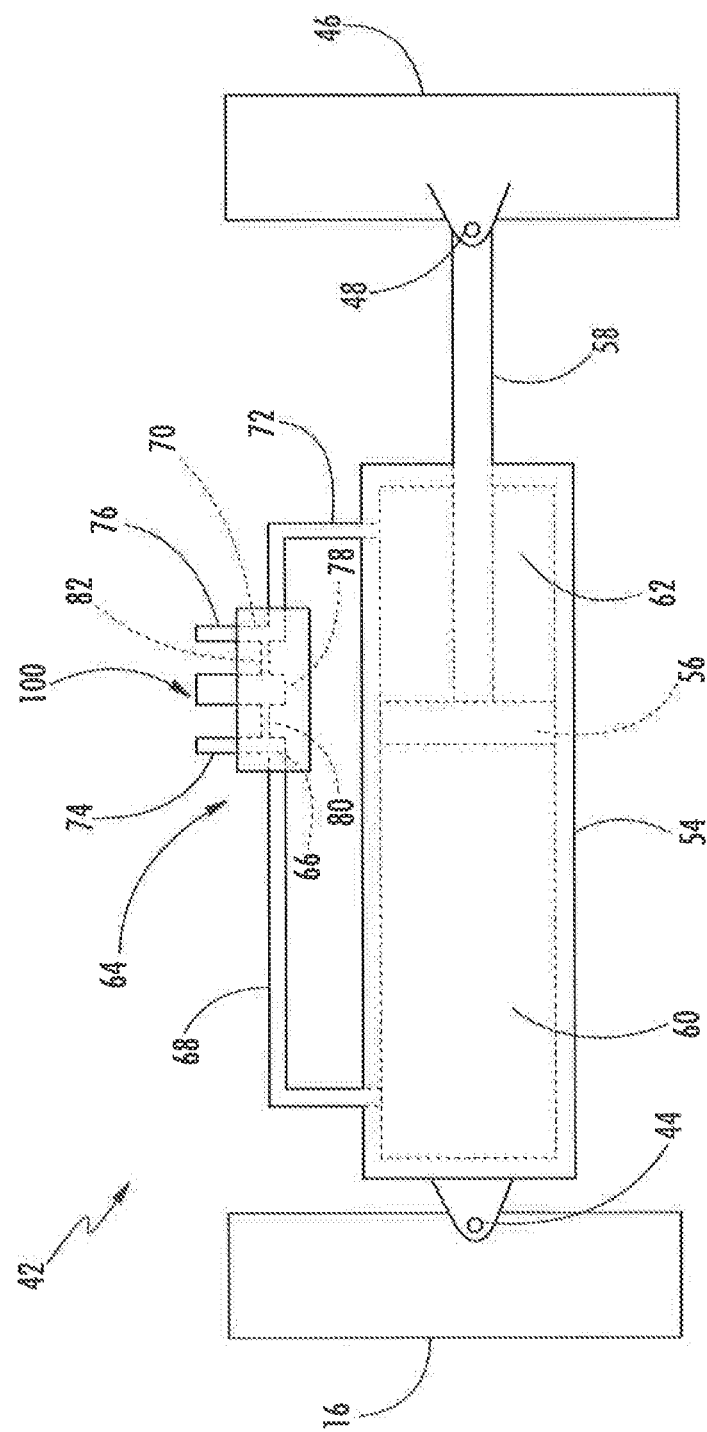
FIG. 3 illustrates a schematic view of one embodiment of a fluid-driven actuator in accordance with aspects of the present subject matter, particularly illustrating a cap-side chamber and a rod-side chamber of the actuator being in fluid communication with a pressure sensor.

Referring now to FIG. 3, a schematic view of an exemplary embodiment of one of the actuators 42 shown in FIGS. 1 and 2 is illustrated in accordance with aspects of the present subject matter. As shown, the actuator 42 may correspond to a hydraulic actuator. Thus, in several embodiments, the actuator 42 may include a cylinder 54 configured to house a piston 56 and a rod 58 coupled to the piston 56 that extends outwardly from the cylinder 54. Additionally, the actuator 44 may include a cap-side chamber 60 and a rod-side chamber 62 defined within the cylinder 54. As is generally understood, by regulating the pressure of the fluid supplied to one or both of the cylinder chambers 60, 62, the actuation of the rod 58 may be controlled. As shown in FIG. 3, in the illustrated embodiment, the end of the rod 58 is coupled to the basket assembly frame 46 at the pivot joint 48 while the cylinder 54 is coupled to the frame 16 at the opposed pivot joint 44. However, in an alternative embodiment, the end of the rod 60 may be coupled to the frame 16 at pivot joint 44 while the cylinder 54 may be coupled to the basket assembly frame 46 at pivot joint 48. It should be appreciated that the actuator 42 may be any suitable type of actuator.

In several embodiments, the actuator 42 may also include a manifold 64 coupled to an exterior of the cylinder 54. Specifically, as shown, the manifold 64 may define various passages that are in fluid communication with the cap-side and rod-side chambers 60, 62. For example, one embodiment, the manifold 64 may define a first passage 66 in fluid communication with the cap-side chamber 60 via a first conduit 68. Similarly, the manifold 64 may also define a second passage 70 in fluid communication with the rod-side chamber 62 via a second conduit 72. As shown, the manifold 64 may include first and second fittings 74, 76 for respectively fluidly coupling the first and second passages 66, 70 to other conduits (not shown) of the implement 10 or the work vehicle. Furthermore, the manifold 64 may define a sensor cavity 78 for receiving a pressure sensor 100. In one embodiment, the sensor cavity 78 may be configured as a standard cartridge valve cavity. First and second transfer passages 80, 82 respectively fluidly couple the first and second passages 66, 70 to the sensor cavity 78 so as to supply fluid from the cap-side and rod-side chambers 60, 62 to the pressure sensor 100. As will be described below, the pressure sensor 100 may be configured to determine a pressure differential between first and second fluid sources, such as between the cap-side and rod-side chambers 60, 62.

Figure 4:
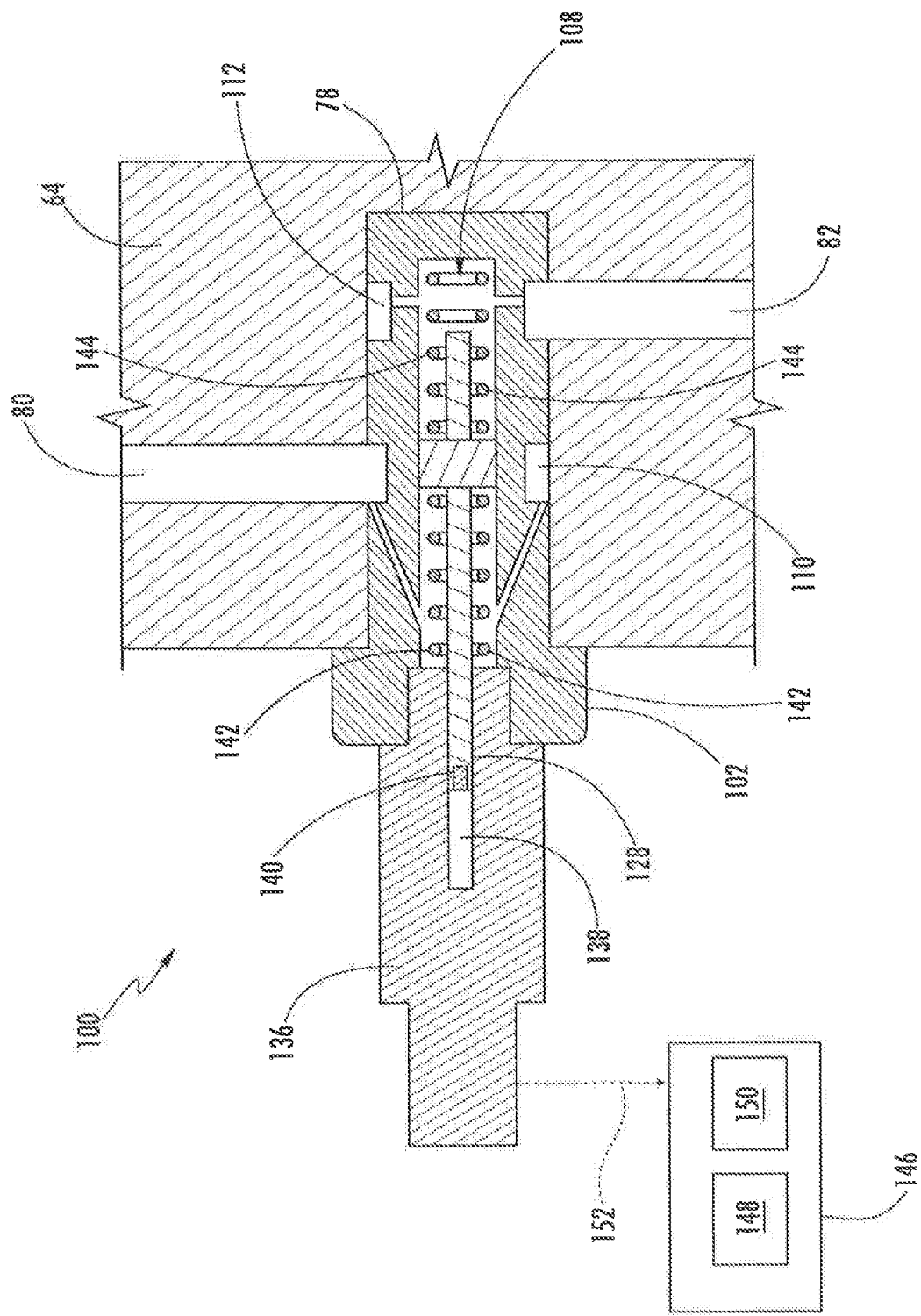
FIG. 4 illustrates a cross-sectional view of one embodiment of a pressure sensor in accordance with aspects of the present subject matter.
Figure 5:
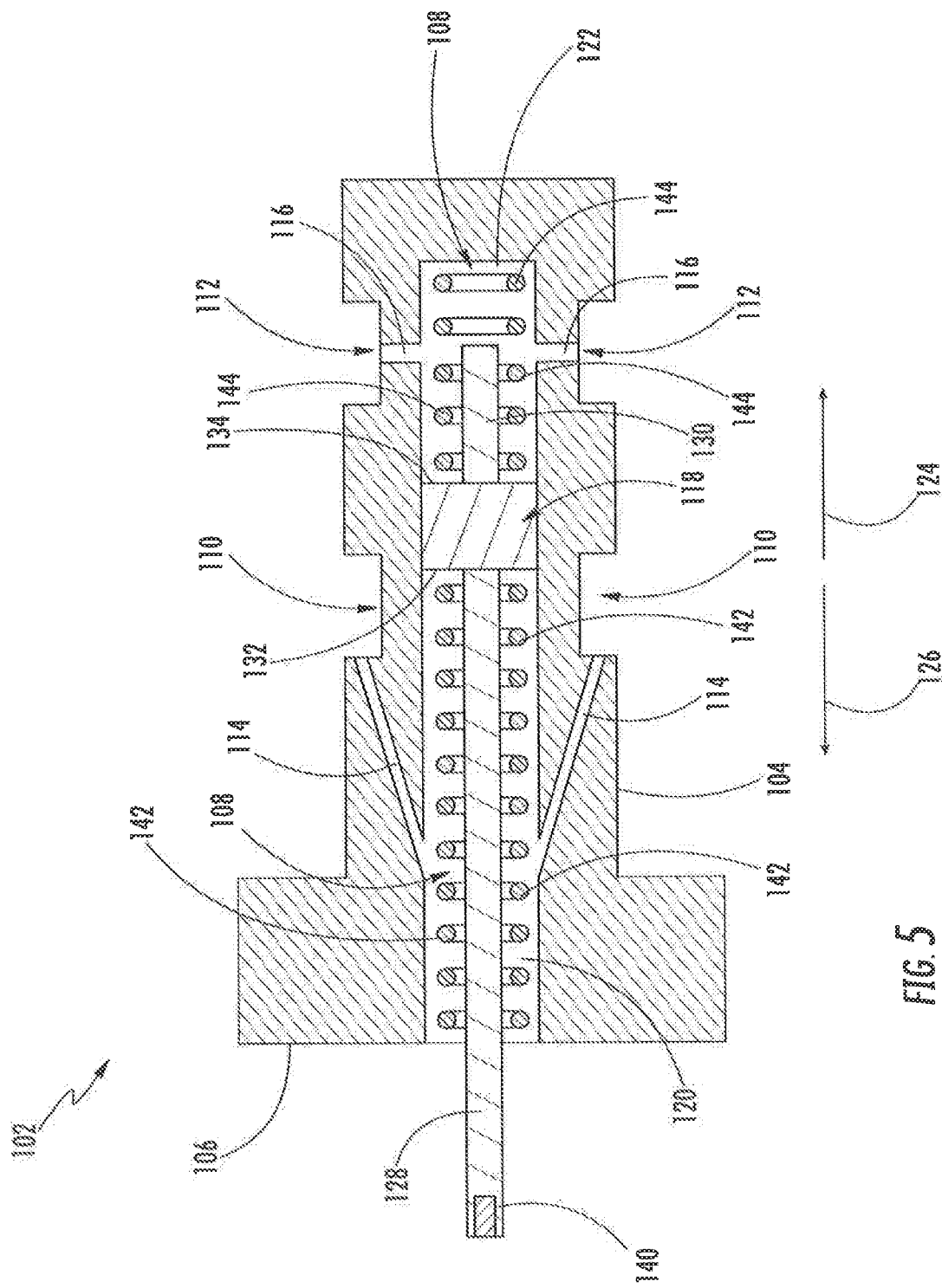
FIG. 5 illustrates an enlarged cross-sectional view of a portion of the pressure sensor shown in FIG. 4, particularly illustrating a sensor body that defines various fluid chambers and passages.

FIGS. 4 and 5 respectively illustrate one embodiment of the disclosed pressure sensor 100 in accordance with aspects of the present subject matter. More specifically, FIG. 4 illustrates a cross-sectional view of the pressure sensor 100. Additionally, FIG. 5 illustrates an enlarged view of the pressure sensor 100, particularly illustrating a sensor body 102 of the pressure sensor 100 that defines various fluid chambers and passages therein.

As shown in FIGS. 4 and 5, the sensor body 102 may be configured for insertion into the manifold 64 such that the sensor body 102 may be at least partially positioned within the sensor cavity 78 of the manifold 64. For example, in one embodiment, the sensor body 102 may include a main body portion 104 that is positioned within the sensor cavity 78 and a head portion 106 that is positioned outside of the sensor cavity 78. Partial positioning of the sensor body 102 within the manifold 64 may reduce the overall space requirements of the pressure sensor 100. As indicated above, the sensor cavity 78 may correspond to a cartridge valve cavity. As such, the sensor body 102 may have a cartridge valve design that is configured for insertion into a cartridge valve cavity. Such a cartridge valve configuration of the sensor body 102 may significantly reduce the space requirements of the pressure sensor 100. In alternate embodiments, the sensor body 102 may have any other suitable configuration. A person of ordinary skill in the art would appreciate that the sensor body may be positioned at least partially within any suitable manifold, valve body, or other component (e.g., another component of the implement 10) in which the sensor body 102 may be exposed to fluid sources between which it is desirable to determine a pressure differential.

In several embodiments, as shown in FIG. 5, the sensor body 102 may define various cavities and passages. For example, the sensor body 102 may define a central cavity 108. In one embodiment, the central cavity 108 may be open at one end of the sensor body 102, such as at the end proximate to the head portion 106, and closed at the other end of the sensor body 102, such as at the end distal to the head portion 106. The sensor body 102 may also define first and second grooves 110, 112 extending circumferentially around an exterior of the sensor body 102. As shown in FIG. 4, the first groove 110 may be in fluid communication with the first transfer passage 80 (which, in turn, is fluidly coupled to the cap-side chamber 60 via the first passage/conduit 66, 68 (FIG. 3)), while the second groove 112 may be in fluid communication with the second transfer passage 82 (which, in turn, is fluidly coupled to the rod-side chamber 62 via the first passage/conduit 70, 72 (FIG. 3)). The first and second grooves 110, 112 may be spaced apart from each other along the sensor body 102. Additionally, as shown in FIG. 5, the sensor body 102 may define one or more first fluid source passages 114 that fluidly couple the first groove 110 and the central cavity 108. Similarly, the sensor body 102 may define one or more second fluid source passages 116 that fluidly couple the second groove 112 and the central cavity 108. As such, the first and second fluid source passages 116 extend between the central cavity 108 and the exterior of the sensor body 102.

The pressure sensor 100 may also include a seal plate 118 that is slidably or otherwise moveably positioned within the central cavity 108. Specifically, in several embodiments, the seal plate 118 may define or otherwise separate first and second chambers 120, 122 within the central cavity 108. As shown in FIG. 5, the first chamber 120 is in fluid communication with the first fluid source passage 114, while the second chamber 122 is in fluid communication with the second fluid source passage 114.

In several embodiments, a pressure differential between the fluid in the first and second chambers 120, 122 may cause the seal plate 118 to move relative to the sensor body 102. For example, if the pressure of the fluid within the first chamber 120 is greater than the pressure of fluid within the second chamber 122, the seal plate 118 may move away from the head portion 106 of the sensor body 102 (e.g., as indicated by arrow 124 in FIG. 5). Conversely, if the pressure of the fluid within the second chamber 122 is greater than the pressure of fluid within the first chamber 120, the seal plate 118 may move toward the head portion 106 of the sensor body 102 (e.g., as indicated by arrow 126 in FIG. 5). As such, the sizes of the first and second fluid chambers 120, 122 may vary based on the pressure differential therebetween.

As shown, in several embodiments, the seal plate 118 may include one or more shafts 128, 130 extending outwardly therefrom. For example, in one embodiment, a first shaft 128 may extend outwardly from a first side 132 of the seal plate 118, such as into the first chamber 120. In particular, the first shaft 128 may be configured such that a portion of the first shaft 128 extends outward from the open end of the sensor body 102 even when the seal plate 118 is positioned at its maximum distance away from the head portion 106. Additionally, a second shaft 130 may extend outwardly from a second side 134 of the seal plate 118, such as into the second chamber 122. As such, the second shaft 130 may be configured to contact a wall of the sensor body 102, such as at the closed end thereof, to limit the maximum distance that the seal plate 118 may move away from the head portion 106 (i.e., in direction 124).

As shown in FIG. 4, the pressure sensor 100 may further include a sensing element 136 coupled to the open end of the sensor body 102. The sensing element 136 may generally be configured to detect a position of the seal plate 118 relative to the sensor body 102. For example, the sensing element 136 may correspond to a Hall Effect sensor. Thus, in several embodiments, the sensing element 136 may define a channel 138 into which the first shaft 128 may extend. A magnet 140 may be coupled to a portion of first shaft 128 positioned within the channel 138. When the seal plate 118 moves within the central cavity 108, a portion of the first shaft 128 and the magnet 140 may move within the channel 138. As such, the sensing element 136 may detect the position of the magnet 140, thereby detecting movement of the first shaft 128 relative to the sensing element 136. Since the first shaft 128 is coupled to the seal plate 118, the movement of the first shaft 128 relative to the sensing element 136 may be indicative of the position of the seal plate 118 relative to the sensor body 102. It should be appreciated that, in alternate embodiments, the sensing element 136 may correspond to a linear variable differential transducer (LVDT) or any other suitable device for detecting the position or movement of the seal plate 118.

Moreover, in several embodiments, the pressure sensor 100 may include first and second springs 142, 144 positioned within the central cavity 108. Specifically, as shown in FIGS. 4 and 5, the first spring 142 may be compressed between the first side 132 of the seal plate 118 and the sensor element 136 to exert a biasing force on the first side 132 of the seal plate 118 acting generally in the direction 124. Similarly, the second spring 144 may be compressed between the second side 134 of the seal plate 118 and the sensor body 102 to exert a biasing force on the second side 134 of the seal plate 118 acting generally in the direction 126. As such, the opposed biasing forces exerted by the first and second springs 142, 144 on the seal plate 118 may generally bias the spring plate 118 to a position relative to the sensor body 102 that is indicative of no pressure differential between the first and second chambers 120, 122 (i.e., the pressure in the first and second chamber 120, 122 is the same). In one embodiment, the first and second springs 142, 144 may have the same or substantially the same spring constants so as to exert equal biasing forces on the seal plate 118. As shown, the first spring 142 may be positioned concentrically around the first shaft 128, and the second spring 144 may be positioned concentrically around the second shaft 130.

In general, the pressure sensor 100 may detect a pressure differential between the fluid in the first and second chambers 120, 122. Thus, in several embodiments, the first and second chambers 120, 122 may respectively fill with fluid from the first and second fluid sources (e.g., the cap-side and rod-side chambers 60, 62). For example, in one embodiment, fluid from the cap-side chamber 60 may flow through the first conduit 68, the first passage 66, and the first transfer passage 80 into the first groove 110. From the first groove 110, the fluid may flow through the first fluid source passage 114 into the first chamber 120. Similarly, fluid from the rod-side chamber 62 may flow through the second conduit 72, the second passage 70, and the second transfer passage 82 into the second groove 112. From the second groove 112, the fluid may flow through the second fluid source passage 116 into the second chamber 122.

As indicated above, a pressure differential between the fluid in the first and second chambers 120, 122 may cause the seal plate 118 to move within the central cavity 108 relative to the seal body 118. For example, if the pressure in the first chamber 120 is greater than the pressure in the second chamber 122, the pressure in the first chamber 120 may overcome the biasing force exerted on the seal plate 118 by the second spring 144, thereby moving the seal plate 118 in the direction 124. Conversely, if the pressure in the second chamber 122 is greater than the pressure in the first chamber 120, the pressure in the second chamber 122 may overcome the biasing force exerted on the seal plate 118 by the first spring 142, thereby moving the seal plate 118 in the direction 142. As such, the position of the seal plate 118 relative to the sensor body 102 may be indicative of the pressure differential between the first and second chambers 120, 122.

The sensing element 136 may detect the distance that the seal plate 118 moves away from the position associated with a zero pressure differential, which may be used to determine the pressure differential between the first and second chambers 120, 122. For example, in one embodiment, the sensing element 136 may detect the position of the magnet 140 relative to the sensing element 136. As indicated above, the magnet 140 may be coupled to the first shaft 128, which may, in turn, be coupled to the seal plate 118. As such, the position of the magnet 140 relative to the sensing element 136 may be indicative of the position of the seal plate 118 relative to the sensor body 102.

Additionally, in several embodiments, the pressure sensor 100 may be communicatively coupled to a controller 146 configured to electronically control the operation of one or more components of the implement 10. In general, the controller 146 may comprise any suitable processor-based device known in the art, such as a computing device or any suitable combination of computing devices. Thus, in several embodiments, the controller 146 may include one or more processor(s) 148 and associated memory device(s) 150 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 150 of the controller 146 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 150 may generally be configured to store suitable computer-readable instructions that, when implemented by the processor(s) 148, configure the controller 146 to perform various computer-implemented functions. In addition, the controller 146 may also include various other suitable components, such as a communications circuit or module, one or more input/output channels, a data/control bus and/or the like.

It should be appreciated that the controller 146 may correspond to an existing controller of the implement 10 or the controller 146 may correspond to a separate processing device. For instance, in one embodiment, the controller 146 may form all or part of a separate plug-in module that may be installed within the implement 10 to allow for the disclosed system and method to be implemented without requiring additional software to be uploaded onto existing control devices of the implement 10.

In several embodiments, the controller 146 may be configured to determine the pressure differential between the first and second fluid sources (e.g., the cap-side and rod-side chambers 60, 62) based on the monitored position of the seal plate 118 relative to the sensor body 102. Specifically, as indicated above, the controller 146 may be communicatively coupled to the pressure sensor 100 via a wired or wireless connection to allow measurement signals (e.g., indicated by dashed line 152 in FIG. 4) to be transmitted from the pressure sensor 100 to the controller 146. As such, the controller 146 may be configured determine or estimate the pressure differential between the first and second fluid sources based on the measurement signals 152 received from the pressure sensor 100. For instance, the controller 146 may include a look-up table or suitable mathematical formula stored within its memory 150 that correlates the sensor measurements to the pressure differential between the first and second fluid sources.

Additionally, in several embodiments, a controller 146 may be configured to electronically control the operation of one or more components of the implement 10 or the associated work vehicle based on the determined pressure differential. For instance, in one embodiment, the controller 146 may be configured to transmit an indication of the determined pressure differential to the operator of the implement 10 (e.g., by causing a visual indication to be presented to the operator within the work vehicle). In such instances, the operator may then use the determined pressure differential as he/she believes is necessary, such as to determine whether a reduction the ground speed of the implement 10 and/or the work vehicle is necessary. Alternatively, the controller 146 may be configured to automatically control the operation of one or more components of the implement 10 and/or the work vehicle (e.g., the vehicle's engine or transmission) in a manner that reduces the ground speed of the implement 10 and/or the work vehicle 12 when the determined pressure differential is too great. In even further embodiments, when the determined pressure differential is too great, the controller 146 may be configured to automatically control the fluid flow to the associated cap-side and/or rod-side chambers 60, 62 to adjust the down force exerted on the associated ground engaging tools 32.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A pressure sensor for detecting a pressure differential between a first fluid source and a second fluid source, the pressure sensor comprising:
 a sensor body defining a cavity having a constant diameter and a constant cross-section extending between a first end of the cavity and a second end of the cavity, the sensor body defining the first end of the cavity;
 a seal plate slidably positioned within the cavity, the seal plate defining first and second chambers within the cavity, the first chamber being in fluid communication with the first fluid source and the second chamber being in fluid communication with the second fluid source;
 a sensing element coupled to the body, the sensing element being configured to detect a position of the seal plate relative to the sensor body, the position of the seal plate being indicative of the pressure differential between the first and second fluid sources, the sensing element defining the second end of the cavity;
 a first spring positioned within the first chamber, the first spring being compressed between a first side of the seal plate and the sensing element; and
 a second spring positioned within the second chamber, the second spring being compressed between a second side of the seal plate and the sensor body.

2. The pressure sensor of claim 1, further comprising:
a first shaft extending outward from the first side of the seal plate, the sensing element being configured to detect movement of the first shaft relative to the sensing element.

3. The pressure sensor of claim 2, further comprising:
a magnet coupled to the first shaft, the sensing element being configured to detect a position of the magnet relative to the sensing element.

4. The pressure sensor of claim 1, wherein the sensing element is a Hall Effect sensor.

5. The pressure sensor of claim 1, further comprising:
a second shaft extending outward from the second side of the seal plate, the second shaft being configured to limit relative movement between the seal plate and the seal body.

6. The pressure sensor of claim 1, wherein the sensor body defines a first passage extending between the first chamber and an exterior of the sensor body and a second passage extending between the second chamber and the exterior of the sensor body, the first passage being in fluid communication with the first fluid source and the second passage being in fluid communication with the second fluid source.

7. The pressure sensor of claim 1, wherein the seal plate has a constant diameter extending between a first end of the seal plate and a second end of the seal plate.

8. The pressure sensor of claim 1, wherein the seal plate is slidably positioned within the cavity such that the seal plate is configured to slidingly contact the sensor body as the seal plate moves between a first end of the cavity and a second end of the cavity.

9. A fluid-driven actuator configured for use with an agricultural implement, the fluid-driven actuator comprising:
a cylinder defining a first fluid chamber and a second fluid chamber;
a piston housed within the cylinder between the first and second fluid chambers;
a manifold in fluid communication with the first and second fluid chambers; and
a pressure sensor provided in operative association with the manifold, the pressure sensor comprising:
a sensor body defining a cavity having a constant diameter and a constant cross-section extending between a first end of the cavity and a second end of the cavity, the sensor body defining the first end of the cavity;
a seal plate slidably positioned within the cavity, the seal plate having a constant diameter extending between a first end of the seal plate and a second end of the seal plate, the seal plate defining first and second chambers within the cavity, the first chamber being in fluid communication with the first fluid chamber of the cylinder and a second chamber being in fluid communication with the second fluid chamber of the cylinder;
a sensing element coupled to the body, the sensing element being configured to detect a position of the seal plate relative to the sensor body, the position of the seal plate being indicative of the pressure differential between the first and second fluid chambers of the cylinder, the sensing element defining the second end of the cavity;
a first spring positioned within the first chamber, the first spring being compressed between a first side of the seal plate and the sensing element; and
a second spring positioned within the second chamber, the second spring being compressed between a second side of the seal plate and the sensor body.

10. The fluid-driven actuator of claim 9, further comprising:
a first shaft extending outward from the first side of the seal plate, the sensing element being configured to detect movement of the first shaft relative to the sensing element.

11. The fluid-driven actuator of claim 10, further comprising:
a magnet coupled to the first shaft, the sensing element being configured to detect movement of the magnet relative to the sensing element.

12. The fluid-driven actuator of claim 9, wherein the sensing element is a Hall Effect sensor.

13. The fluid-driven actuator of claim 9, further comprising:
a second shaft extending outward from the second side of the seal plate, the second shaft being configured to limit relative movement between the seal plate and the seal body.

14. The fluid-driven actuator of claim 9, wherein the sensor body defines a first passage extending between the first chamber and an exterior of the sensor body and a second passage extending between the second chamber and the exterior of the sensor body, the first passage being in fluid communication with the first fluid chamber and the manifold, the second passage being in fluid communication with the second fluid chamber and the manifold.

15. The fluid-driven actuator of claim 9, wherein the cavity has a constant diameter and a constant cross-section extending between a first end of the cavity and a second end of the cavity.

16. The fluid-driven actuator of claim 9, wherein the seal plate is slidably positioned within the cavity such that the seal plate is configured to slidingly contact the sensor body as the seal moves between a first end of the cavity and a second end of the cavity.

17. An agricultural implement, Comprising:
a frame;
a ground-engaging tool pivotably coupled to the frame; and
a fluid-driven actuator coupled between the frame and the ground-engaging tool, the fluid-driven actuator being configured to adjust a position of the ground-engaging tool relative to the frame, the fluid-driven actuator comprising:
a cylinder defining a first fluid chamber and a second fluid chamber;
a piston housed within the cylinder between the first and second fluid chambers;
a manifold in fluid communication with the first and second fluid chambers; and
a pressure sensor provided in operative association with the manifold, the pressure sensor comprising:
a sensor body defining a cavity having a constant diameter and a constant cross-section extending from a first end of the cavity to a second end of the cavity, the sensor body defining the first end of the cavity;
a seal plate slidably positioned within the cavity such that the seal plate is configured to slidingly contact the sensor body as the seal moves between the first end of the cavity and the second end of the cavity, the seal plate defining first and second chambers within the cavity, the first chamber being in fluid communication with the first fluid chamber of the cylinder and a second chamber being in fluid communication with the second fluid chamber of the cylinder;

a sensing element coupled to the body, the sensing element being configured to detect a position of the seal plate relative to the sensor body, the position of the seal plate being indicative of the pressure differential between the first and second fluid chambers of the cylinder, the sensing element defining the second end of the cavity;

a first spring positioned within the first chamber, the first spring being compressed between a first side of the seal plate and the sensing element; and a second spring positioned within the second chamber, the second spring being compressed between a second side of the seal plate and the sensor body.

18. The agricultural implement of claim 17, wherein the ground-engaging tool corresponds to a basket assembly.

19. The agricultural implement of claim 17, wherein the seal plate has a constant diameter extending between a first end of the seal plate and a second end of the seal plate.

20. The agricultural implement of claim 17, wherein the cavity has a constant diameter and a constant cross-section extending between a first end of the cavity and a second end of the cavity.

* * * * *